United States Patent [19]
Castelli et al.

[11] Patent Number: 4,966,925
[45] Date of Patent: Oct. 30, 1990

[54] ANTIFOULING ORGANOMETALLIC POLYMER RUBBER COVERINGS

[75] Inventors: Vincent J. Castelli, Severna Park; William L. Yeager, Queen Anne, both of Md.

[73] Assignee: The United States of America as represented by the Secretary of the Navy, Washington, D.C.

[21] Appl. No.: 204,317

[22] Filed: Jun. 9, 1988

[51] Int. Cl.$^5$ .......................... C08K 3/20; C08K 5/57; C08L 11/00; C08L 33/02
[52] U.S. Cl. .................................... 523/177; 523/122; 524/300; 524/322; 524/432; 524/433; 524/495; 524/496; 524/522; 524/523
[58] Field of Search ................. 523/122, 177; 524/432, 524/495, 496, 433, 300, 322, 522, 523

[56] References Cited

U.S. PATENT DOCUMENTS

| | | | |
|---|---|---|---|
| 3,426,473 | 2/1969 | Cardarelli et al. | 43/131 |
| 3,497,990 | 3/1970 | Jeffries | 43/131 |
| 3,505,758 | 4/1970 | Willisford | 43/131 |
| 3,979,354 | 9/1976 | Dyckman et al. | 260/37 |
| 4,021,392 | 5/1977 | Milne et al. | 523/177 |
| 4,075,319 | 2/1978 | Dyckman et al. | 424/78 |
| 4,082,709 | 4/1978 | Dyckman et al. | 260/22 |
| 4,139,515 | 2/1979 | Dennington | 523/177 |
| 4,389,460 | 6/1983 | Dawans et al. | 428/458 |
| 4,401,703 | 8/1983 | Rodgers | 428/72 |
| 4,485,197 | 11/1984 | Yokoi et al. | 523/177 |
| 4,599,368 | 7/1986 | Kimmel et al. | 523/177 |
| 4,670,481 | 6/1987 | Foscante et al. | 523/177 |
| 4,687,792 | 8/1987 | Russell et al. | 523/177 |
| 4,752,629 | 6/1988 | Proudlock et al. | 523/177 |
| 4,774,080 | 9/1988 | Yamamori et al. | 523/177 |

FOREIGN PATENT DOCUMENTS 213620 10/1968 U.S.S.R. .

Primary Examiner—Herbert J. Lilling
Attorney, Agent, or Firm—Luther A. Marsh; Thomas S. O'Dwyer

[57] ABSTRACT

Objects which are designed to be submerged in a marine environment are protected from fouling for an extended period of time by the use of elastomeric based covering materials which are characterized by a constant delivery rate of the incorporated organometallic polymer toxicant from the formulation. The formulation consists essentially of, by weight, from about 44% to about 85% of elastomeric material selected from the group consisting of neoprene (polychloroprene) rubber, natural rubber, and EPD (ethylene-propylene-diene) rubber; from about 7% to about 25% of selected fillers, antioxidants, accelerators, pigments, and other processing compounds, and; from about 1% to about 48% of organometallic polymer containing pendant group tri-n-butyltin selected from the group consisting of poly (tri-n-butyltin methyacrylate-co-tri-n-propyltin methyacrylate-co-methyl methacrylate 1:1:1 mole ratio, poly (tri-n-butyltin methacrylate-co-methyl methacrylate) 1:1 mole ratio, tri-n-butyltin ester of poly (methyl vinyl ether-co-maleic acid) 1:1 mole ratio and tri-n-butyltin ester of poly methacrylic acid cross-lined with divinylbenzene.

27 Claims, No Drawings

ANTIFOULING ORGANOMETALLIC POLYMER RUBBER COVERINGS

The invention described herein may be manufactured and used by or for the Government of the United States of America for governmental purposes without the payment of any royalties thereon or therefor.

BACKGROUND OF THE INVENTION

1. Field of the Invention

The present invention relates to fouling resistant coverings and more specifically to novel elastomeric materials and methods for incorporating biocidal agents therein which are capable of surviving for extended periods of time in an aqueous environment.

2. Description of the Prior Art

Marine organisms which attach themselves to submerged surfaces of ships cause increased resistance to water passage and such friction effects an operational speed reduction and contributes to increased fuel consumption. By adhering either on metal or rubber substrates, such organism enhance the ship's signature by providing a source of additional background noise. Encrustation also adversely affects equipment functions, particularly when they attach themselves to such acoustical devices as sonar domes and sonar shields. In the case of sonar domes, which are often provided with smooth rubber surfaces, these marine organisms not only destroy the surface integrity of the domes but also provide sites which tend to deflect and scatter the sonar beams. The accumulation of various marine organisms on bouys, pier pilings, ships hulls and the like and in high cavitation and erosion situations such as on the blades of propellers, legs of hydrofoils, and on discharge pumps, is deleterious to reliability and greatly increses equipment maintenance.

To prevent the accumulation of marine organisms on rubber and metal substrates, the prior art illustrates a number of combinations of polymer materials that contain biocidal agents to resist fouling on underwater surfaces. These are exemplified by, for example, U.S. Pat. No. 3,426,473. This antifoulant covering uses neoprene rubber impregnated with an organometal toxicant such as bis (tri-n-butyltin) oxide as a reservoir layer to which is laminated an elastomer sheet which serves as a toxic transfer control sheet This material is produced as a proprietary antifoulant neoprene sheet marketed under the tradename of NO-FOUL (a registered trademark of the B.F. Goodrich Co.). The major drawbacks of this material are its high application cost and the rigid quality control that is required during bonding of the cured sheets to ensure proper surface adhesion. Also, NO-FOUL evidences poor impact resistance and there exists the possibility of worker exposure to airborne organotin during application.

As a consequence, several improved covering materials have been developed. One example, as shown in U.S. Pat. No. 3,497,990, describes a cellular antifouling covering for submerged marine objects. The covering consists of a layer of foam material having interconnected cells containing diffusible antifoulant material. The antifoulant material diffuses through the permeable elastomeric cover layer to replace any material which has been washed away by the sea water. Another example, in U.S. Pat. No. 3,505,758, illustrates an antifouling covering for submerged marine objects, such as, sonar domes. This covering consists of a double-wall, rubber coated fabric reservoir which carries an intermediate layer of diffusable toxic or repellant material. A modular antifouling tile is disclosed in U.S. Pat. No. 4,401,703. This system employs a plurality of discrete tile units which are individually formed with internal reservoirs for containing antifoulant toxicants that diffuse through the elastomeric matrix of the covering surface.

However, all of the above coverings are based upon a leachable reservoir principle which permits insitu replenishment of the toxicant. The main disadvantage of these arrangements remains the high initial rate at which the antifoulants diffuse into the immersion waters. All exhibit toxicant release rates which decrease logarithmically with time which is characteristic of diffusion-controlled release coatings. That is, considerable amounts of toxicant is released intially which decreases, within a relatively short period of time, typically 14–18 months, to a residual toxic release rate that is insufficient to control marine growth yet remains in the covering even though no longer effective.

Several U.S. patents which are currently assigned to the United States Government are also pertinent to the present invention. U.S. Pat. No. 3,979,354 describes an antifouling composition comprising an organotin polymer wherein the tin is chemically combined in the polymer. The polymer bound tin is effective in reducing the leaching rate of the organometal from the compound. U.S. Pat. Nos. 4,075,319 and 4,082,709 bond organotin to polyester resins and vinyl polymer backbones such as the homopolymers and copolymers of acrylic and methacrylic acid monomers or copolymers of methyl vinyl ether and maleic acid. These resins exhibit excellent antifouling performance when exposed as neat resins and perform well as base resins in hull coatings which, when properly formulated, are suitable for use as film forming coatings such as antifouling paints.

The many attendant advantages of antifoulant paints based upon organotin acrylate polymers, including a constant delivery rate of the antifoulant, has caused many manufacturers to develop organotin polymer coating systems. Since a lixiviation/hydrolysis process of the paint film is relied upon to deliver the toxicant, some formulations have concentrated upon varying the polymer to control the erosion rate, while others, as evidenced for example by U.S. Pat. No. 4,021,392, have included hydrophobic additives such as chlorinated waxes, chlorinated rubbers, polyacrylate esters, and silicones as retarders.

Thus, while organometal polymers are known to be used in the field of paint technology, previous attempts to incorporate significant antifouling protection by compounding these toxic containing compositions into an elastomeric material have resulted in either complete degradation of the physical properties or an unacceptably short service life. Materials such as NO-FOUL which use free organometals physically mixed with the neoprene rubber are not reacted solutions and thus represent only mechanical suspensions with the result that these types of materials may contain nonuniform dispersions.

SUMMARY OF THE INVENTION

No prior art observed has provided low leaching organmetallic polymers (OMP) which, when compounded with the base elastomeric materials' matrix, represent the reacted products of a polymerized rubber treatment. The formulation of the OMP toxicant with the elastomer distinguishes this system, which relies on controlled hydrolysis and erosion to deliver the incorporated organometal, from conventional covering systems whose life expectancy is more dependent upon factors which effect the diffusion of the toxicant out of the reservoir layer, such the solubility limit of the reservoir material and permeability of the toxic control transfer sheet. Since these OMP included materials represent uniform dispersions throughout the rubber, they may be utilized without the toxic control transfer sheet which have characterised reservoir type materials in the past.

Since these new antifouling coverings are not laminates, but homogenous rubber materials incorporating organotin polymers, they may be manufactured at less cost and adhered more effectively. Such rubber materials are inherently capable of containing more repellant and yielding a greater amount of controllable toxic material than can be contained in a layer of antifouling paint. Additionally, such materials have demonstrated a high degree of flexibility and retention of physical properties and have good resiliancy and erosion resistance in high cavitation environments. Therefore, applicants invention consists of materials, methods, and application techniques which, when properly employed, provide an extended service life over comparable antifoulant coating materials.

Accordingly, it is an object of this invention to provide materials and methods for protection of marine structures from fouling organisms.

It is also an object of this invention to provide materials and methods for protection of marine structures from fouling which is both effective and long-lasting.

It is a further object of this invention is to provide improved materials and methods for the prevention of fouling of marine structures while avoiding a potential environmental hazard.

Another object of this invention to provide antifouling materials which are characterized by controllable leaching rates of the antifouling toxicant from the material.

Yet another object of this invention is to provide antifouling materials which are inherently reactivated and which will continuously deliver a constant toxicant rate of release over time.

It is also an object of this invention to provide antifouling materials that are considerably less volitile than those which are formulated with free organometals, greatly reducing the possible exposure hazard of workers during adhesion of the final product.

It is a further object of this invention to provide antifouling materials which afford improved bonding to a rigid substrate so as to provide antifoulant protection to such surfaces as were not previously capable of receiving such protection.

It is still a further object of this invention to provide improved performance characteristics of antifouling rubber materials under dynamic impact conditions and high cavitation erosion applications. elastomeric coverings which are blended from gum stock materials selected from the group consisting of neoprene (polychloroprene) rubber, natural rubber, and EPD (ethylene-propylene-diene) rubber, with selected fillers, antioxidants, accelerators, pigments, and other processing compounds; and polymers containing pendant group tri-n-butyltin selected from the group consisting of poly (tri-n-butyltin methacrylate-co-tri-n-propyltin methacrylate-co-methyl methacrylate) 1:1:1 mole ratio, poly (tri-n-butyltin methacrylate-co-methyl methacrylate) 1:1 mole ratio, tri-n-butyltin ester of poly (methyl vinyl ether-co-maleic acid) 1:1 mole ratio and tri-n-butyltin ester of poly methacrylic acid cross-lined with divinylbenzene.

DETAILED DESCRIPTION OF THE INVENTION

In order to attain the above mentioned desirable characteristics, various organometallic polymers (OMP) were formulated with several elastomeric materials to produce new inherently antifouling coverings. Although many natural or synthetic elastomeric base materials are suitable, by way of example, Table I below lists three stock rubber formulations comprising neoprene (polychloroprene), natural rubber, and EPD (ethylene-propylene-diene) rubber with various selected fillers, antioxidants, accelerators, and other processing compounds. The organometallic polymers selected for this application use the marine biocide tri-n-butyltin which is chemically bound to a polymer backbone. The organometallic polymers (OMP) listed in Table II were used as the antifoulant additives.

TABLE I

| Base Rubber Formulations (parts by weight) | | | |
|---|---|---|---|
| | Test Specimen Numbers | | |
| | RZ1-6, 22-3, 26-7, 30-1, 34-5, 38-9, 42-51 | RZ7-12, 24-5, 28-9, 32-3, 36-7, 40-1 | RZ13-18 |
| Neoprene WRT (polychloroprene) | 100 | — | — |
| Natural Rubber (NBS Standard Natural R552) | — | 100 | — |
| Ethylene-propylene-diene (EPCAR 5465)* | — | — | 100 |
| FEF Black (Carbon Black ASTM N550) | 15 | — | — |
| HAF Black (Carbon Black ASTM N330) | 1 | 10 | 50 |
| Zinc Oxide | 5 | 2 | 3 |
| Magnesium Oxide | 4 | — | — |
| Phenyl-B-naphthalene (PBNA antioxidant) | 2 | 1 | — |
| Lauric Acid | 3 | — | — |
| Stearic Acid | — | 0.2 | — |
| Benzothiazyl disulfide (Altrax accelerator) | 1 | 2 | — |

TABLE I-continued

| Base Rubber Formulations (parts by weight) | | | |
|---|---|---|---|
| | Test Specimen Numbers | | |
| | RZ1-6, 22-3, 26-7, 30-1, 34-5, 38-9, 42-51 | RZ7-12, 24-5, 28-9, 32-3, 36-7, 40-1 | RZ13-18 |
| 2-mercaptoimidazoline (NA-22 secondary accelerator) | 0.75 | — | — |
| Sulfur | — | 2.5 | — |
| 2-mercaptobenzothiozole (Captax accelerator) | — | — | 0.2 |
| Tetramethylthiuram disulfide (TMTD ultra-accelerator) | — | — | 1 |

*EPCAR is a registered trademark of the B. F. Goodrich Co., Inc.

TABLE II

| Organometallic Polymer Additives | |
|---|---|
| OMP-1 | Poly (tri-n-butyltin methacrylate-co-tri-n-propyltin methacrylate-co-methyl methacrylate) 1:1:1 mole ratio |
| OMP-2 | Poly (tri-n-butyltin methacrylate-co-methyl methacrylate) 1:1 mole ratio |
| OMP-4 | Tri-n-butyltin ester of poly (methyl vinyl ether-co-maleic acid) 1:1 mole ratio |
| OMP-5 | Tri-n-butyltin ester of poly methacrylic acid cross-linked with divinylbenzene |

The organometallic polymer rubbers were prepared in accordance with the following procedures: The initial work consisted of a study to determine the compatibility of the organometallic polymers (OMP) with the three selected base rubber material formulations listed in Table I. This work consisted of two phases. attainable for OMP's 1, 2, 4, and 5 with the base neoprene, natural and EPD rubbers. In order to accomplish this, OMP materials 1, 2, and 4 were oven dried at 140 F (60 C) for several days to remove as much solvent as possible before compounding with the base rubbers. The solid OMP-5 required particle size reduction by cryogenic grinding before it could be used as an additive.

The antifoulant OMP materials were then compounded with the three stock rubbers on a 6 inch (15.24 cm.) three roll laboratory mill using standard techniques well known and commonly used in the art. Mill temperatures were maintained at ambient levels for the neoprene rubber, at approximately 110 F. (43 C.) for the natural rubber, and at approximately 160 F. (71 C.) for the EPD rubber stock. The saturation levels for each OMP material in the stock rubbers could then be determined. The maximum loadings for each organometallic polymer in the selected stock materials is displayed in Table III below.

TABLE III

| | Maximum OMP Loading (percent by weight) | | | |
|---|---|---|---|---|
| | OMP-1 | OMP-2 | OMP-4 | OMP-5 |
| Neoprene WRT | 14.7 | 23.9 | 20.1 | 24.0 |
| Natural Rubber R552 | 26.5 | 48.1 | 31.9 | 15.1 |
| EPD (EPCAR 5465)* | 30.1 | 21.5 | 25.9 | 14.9 |

*EPCAR is registered trademark of the B. F. Goodrich Co., Inc.

Once a maximum organometallic polymer (OMP) loading for each stock material had been established, the second phase of this work could begin. In phase two, OMP loading percentages were varied in order to assess the limits of the antifoulant protection afforded by these new materials under field exposures. The batches were first diluted to 90 percent of maximum loading and then extruded as sheet material by conventional processes which are well known and commonly used in the art. In the case of OMP-2 and OMP-5, a second dilution to approximately 50 percent of the maximum loading was made. Other sample formulations which contained various OMP concentrations were also made in order to test the lower ranges at which the antifoulant protection was effective. The organometallic polymer concentration levels ranged from 0.1 percent to 43.3 percent by weight. All specimens were cured in a 6 in. × 6 in. × 0.1 in. thick (15.24 cm. × 15.24 cm. × 0.25 cm.) mold at 290 F. (143 C.) for 30 minutes at 15,000 lbs. (6804 kg.) ram pressure.

A total of fifty-one different elastomers were produced in this manner. Three of the fifty-one were control samples and contained only formulations manufactured in accordance with Table I without any OMP additive These new OMP-rubber materials were subjected to normal rubber qualification tests for performance under static and dynamic immersion situations and for adhesion to metal substrates by glueing and by vulcanization. The static test results of these fouling resistant rubbers conducted at Miami Beach, Florida are summarized in Table IV. In the Table below, 100% resistant excludes all marine growth of any kind except a light coat of slime.

TABLE IV

| | Months of Antifouling Resistance of Test Specimens at Miami Beach, Florida | | |
|---|---|---|---|
| Test Specimen No. (OMP parts by weight) | Months 100% Resistant to All Fouling | Months 90% Resistant to All Fouling | Months 80% Resistant to All Fouling |
| RZ-1 (OMP-1, 20.00) | 40 | 44 | 52 |
| RZ-2 (OMP-2, 36.10) | 85* | — | — |
| RZ-3 (OMP-2, 15.80) | 85* | — | — |
| RZ-4 (OMP-2, 29.10) | 85* | — | — |
| RZ-5 (OMP-2, 36.30) | 85* | — | — |
| RZ-6 (OMP-2, 16.00) | 85* | — | — |
| RZ-7 (OMP-1, 36.80) | 85* | — | — |

TABLE IV-continued

Months of Antifouling Resistance of Test Specimens at Miami Beach, Florida

| Test Specimen No. (OMP parts by weight) | Months 100% Resistant to All Fouling | Months 90% Resistant to All Fouling | Months 80% Resistant to All Fouling |
| --- | --- | --- | --- |
| RZ-8 (OMP-2, 89.90) | 85* | — | — |
| RZ-9 (OMP-2, 37.40) | 85* | — | — |
| RZ-10 (OMP-4, 63.90) | 85* | — | — |
| RZ-11 (OMP-4, 18.50) | 85* | — | — |
| RZ-12 (OMP-4, 08.60) | 85* | — | — |
| RZ-13 (OMP-1, 57.70) | 85* | — | — |
| RZ-14 (OMP-2, 18.80) | 85* | — | — |
| RZ-15 (OMP-2, 36.40) | 85* | — | — |
| RZ-16 (OMP-4, 47.40) | 85* | — | — |
| RZ-17 (OMP-5, 11.10) | 44 | 50 | 63 |
| RZ-18 (OMP-5, 24.01) | 51 | 63 | — |
| RZ-19 Neoprene Control | 4 | 7 | 11 |
| RZ-20 Natural Control | 16 | 20 | 24 |
| RZ-21 EPD Control | 13 | 16 | 22 |
| RZ-22 (OMP-2, 06.97) | 51 | 60 | 69 |
| RZ-23 (OMP-2, 06.97) | 51 | 75 | 76 |
| RZ-24 (OMP-5, 06.19) | 48 | 51 | 54 |
| RZ-25 (OMP-5, 06.19) | 85* | — | — |
| RZ-26 (OMP-2, 01.33) | 42 | 46 | 48 |
| RZ-27 (OMP-2, 01.33) | 42 | 46 | 56 |
| RZ-28 (OMP-5, 01.19) | 46 | 49 | 51 |
| RZ-29 (OMP-5, 01.19) | 42 | 44 | 46 |
| RZ-30 (OMP-2, 00.66) | 40 | 44 | 47 |
| RZ-31 (OMP-2, 00.66) | 51 | 54 | 54 |
| RZ-32 (OMP-5, 01.59) | 42 | 45 | 51 |
| RZ-33 (OMP-5, 01.59) | 46 | 50 | 52 |
| RZ-34 (OMP-2, 00.26) | 34 | 36 | 38 |
| RZ-35 (OMP-2, 00.26) | 39 | 40.5 | 42 |
| RZ-36 (OMP-5, 00.24) | 51 | 54 | 63 |
| RZ-37 (OMP-5, 00.24) | 46 | 48 | 51 |
| RZ-38 (OMP-2, 00.13) | 5 | 6.5 | 8 |
| RZ-39 (OMP-2, 00.13) | 8 | 14 | 18 |
| RZ-40 (OMP-5, 00.12) | 18 | 32 | 44 |
| RZ-41 (OMP-5, 00.12) | 6 | 10 | 24 & 41 |
| RZ-42 (OMP-4, 06.93) | 63 | 69 | 77 |
| RZ-43 (OMP-4, 06.93) | 63 | 69 | 77 |
| RZ-44 (OMP-4, 01.33) | 44 | 51 | 60 |
| RZ-45 (OMP-4, 01.33) | 48 | 50.5 | 66 |
| RZ-46 (OMP-4, 00.66) | 42 | 44 | 46 |
| RZ-47 (OMP-4, 00.66) | 36 | 39 | 40.5 |
| RZ-48 (OMP-4, 00.26) | 42 | 44 | 47 |
| RZ-49 (OMP-4, 00.26) | 8 | 12 | 32 |
| RZ-50 (OMP-4, 00.13) | 7.5 | 16 | 35 |
| RZ-51 (OMP-4, 00.13) | 16 | 30 | 40 |

*represent continuing tests

Compatibility of the OMP resins with synthetic and natural rubbers have thus been established with a majority of the resultant OMP-rubber formulations exhibiting 80% or better antifouling performance after fifty six months of marine exposure in a semi-tropical environment. Twenty three of the fifty one test samples were in the 100% antifouling range after fifty one months of exposure and sixteen of the test samples remain 100% after eighty five months of exposure. Marine fouling adhesion on certain of the other formulations was tenuous at best. The presence of algal or slime film on many test samples, which seems to promote barnacle attachment, also prevents firm attachment of further fouling organisms to the rubber substrate. Additionally, it should be noted that test panel RZ-41 which previously exhibited large amounts of both algae and hard fouling at 24 months, had shed some of this accumulation upon continued exposure and displayed improved antifoulant peformance with time.

When the organometallic polymer is properly formulated with the elastomer, the lixiviation process operates, in the presence of seawater, by hydrolysis, releasing organometal and forming a hydrophilic surface. Such hydrophilic surface then erodes and exposes fresh organometal. Thus, a controlled rate of hydrolysis and erosion of the covering surface is relied upon to deliver the toxicant This results in a constant leaching rate of the organometal and, providing that the included organometallic polymer is at the minimum value necessary to control fouling, the service life of these materials becomes a direct linear function of covering thickness. Therefore, fourty eight other control samples with formulations in which tributyltin oxide was substituted for the organometallic polymer additive in the neoprene stock rubber, essentially in accordance with the Table I formulation, were also prepared. In these thicknesses were varied from 0.029 inch to 0.193 inch (4.9 mm to 7.4 mm) in order to assess the limits of antifoulant protection of these materials as dependent upon thickness during conventional marine exposure at the Miami Beach, Florida test site.

In order to evaluate the cavitation/erosion resistance of these low leaching antifouling materials, OMP saturated neoprene rubber formulations were applied to four ship propellers and subjected to dynamic field tests conducted at Annapolis, Maryland. Both sides of the propeller blade surfaces were chemically milled with depressions so that uncured one-eigth inch thick rubber sheets could be manufactured for direct vulcanization onto the controlled-pitch LST class ship propellers. These depressions covered the entire blade surface except for a designated border strip of 3 to 4 inches around the edge of each blade. This approach had a number of advantages in that the covering material could be cut, formed, and adhered to the etched surface where it was subsequently vulcanized in place using partially polymerized rubber as a tie coat. This method results in optimal adhesion between the covering and the substrate. After vulcanization, the rubber insert could then be faired to conform to the designed hydrodynamic surface of the propeller blade. Because the covering material did not extend to the blade edge, it did not interfere with Prairie air systems on large propellers, and it eliminated any possibility of edge damage due to impact during normal operation. In conjunction with its relative ease of application, direct vulcanization also eliminated many delamination problems experienced with some commercial antifouling neoprenes which are adhesively bonded cured sheets. As an alternative to a complete covering system, the above described method of attachment is similarly applicable to areas such as the legs of hydrofoils, sonar domes and other submerged objects which may be subject to high cavitation and erosion yet are in need of antifoulant protection.

From all of the abovementioned test results it was determined that the following ranges provide a suitable composition for long term antifouling protection. Antifoulant performance is dependent upon OMP concentration, with formulations possessing the highest OMP content generally exhibiting the best antifouling performance. While one percent OMP loading in certain formulations provided antifouling protection for 42 months with specimens tending to either be free of fouling or only slightly fouled, in general at least five percent appears to be the lower limit of OMP loading which is sufficient to provide 100% antifouling performance for 51 months or longer. Extended service life is also dependent upon the thickness of the applied coating with the thicker panels generally providing better antifouling protection. Although there are some specimens in the 0.060 inch to 0.065 inch range which still demonstrate a 100% antifouling rating, most samples thinner than 0.065 inch have tended to foul after 26–32 months of exposure.

Table V lists selected OMP-elastomer systems which exhibit the greatest durability and ease in processing using conventional rubber compounding equipment and techniques. These preferred embodiments thus represent the most likely candidate formulations from the standpoint of commercial large scale production.

TABLE V

Suitable Organometallic Polymer and Elastomer Combinations

| from Table II | from Table I Formulations |
| --- | --- |
| OMP-1 | Natural Rubber |
| OMP-2 | Neoprene (polychloroprene) |
| | EPD (Ethylene-propylene-diene) |
| OMP-4 | Natural Rubber |
| | Neoprene (polychloroprene) |
| | EPD (Ethylene-propylene-diene) |
| OMP-5 | Natural Rubber |

Obviously many modifications and variations of the present invention are possible in light of the above teachings. It is therefore to be understood that within the scope of the appended claims the invention may be practiced otherwise than as specifically described.

What is claimed is:

1. A low leaching nonpolluting marine antifouling covering formulation comprising of the blended product of the following materials and consisting essentially of, by weight:
    (a) from about 44% to about 85% of elastomeric material selected from the group consisting of neoprene (polychloroprene) rubber, natural rubber, and EPD (ethylene-propylene-diene) rubber,
    (b) from about 7% to about 25% of selected fillers, antioxidants, accelerators, pigments, and other processing compounds, and
    (c) from about 1% to about 48% of organometallic polymer containing pendant group tri-n-butyltin selected from the group consisting of poly (tri-n-butyltin methyacrylate-co-tri-n-propyltin methacrylate-co-methyl methacrylate) 1:1:1 mole ratio, poly (tri-n-butyltin methacrylate-co-methyl methacrylate) 1:1 mole ratio, tri-n-butyltin ester of poly (methyl vinyl ether-co-maleic acid) 1:1 mole ratio and tri-n-butyltin ester of poly methacrylic acid cross-linked with divinylbenzene.

2. A low leaching nonpolluting marine antifouling covering formulation as in claim 1, wherein said acclerators are benzothiazyl disulfide, 2-mercaptoimidazoline, 2-mercaptobenzothiazole, and tetramethylthiuram disulfide.

3. A low leaching nonpolluting marine antifouling covering formulation as in claim 1, wherein said antioxidant is phenyl-b-naphthalene.

4. A low leaching nonpolluting marine antifouling covering formulation as in claim 1, wherein said pigments are FEF carbon black, HAF carbon zinc oxide, and magnesium oxide.

5. A low leaching nonpolluting marine antifouling covering formulation as in claim 1, wherein said filler material is sulfur.

6. A low leaching nonpolluting marine antifouling covering formulation as in claim 1, wherein said processing compound is selected from the group consisting of lauric acid and stearic acid.

7. A low leaching nonpolluting marine antifouling covering formulation comprising of the blended product of the following materials and consisting essentially of, by weight:
    (a) from about 56% to about 76% of neoprene (polychloroprene)
    (b) from about 7% to about 25% of selected antioxidants,
    (c) from about 1% to about 24% of organometallic polymer containing pendant group tri-n-butyltin selected from the group consisting of poly (tri-n-butyltin methyacrylate-co-tri-n-propyltin methacrylate-co-methyl methacrylate) 1:1:1 mole ratio, poly (tri-n-butyltin methacrylate-co-methyl methacrylate) 1:1 mole ratio, tri-n-butyltin ester of poly (methyl vinyl ether-co-maleic acid) 1:1 mole ratio and tri-n-butyltin ester of poly methacrylic acid cross-linked with divinylbenzene.

8. A low leaching nonpolluting marine antifouling covering formulation as in claim 7, wherein said acclerators are benzothiazyl disulfide and 2-mercaptoimidazoline.

9. A low leaching nonpolluting marine antifouling covering formulation as in claim 7, wherein said antioxidant is phenyl-b-naphthalene.

10. A low leaching nonpolluting marine antifouling covering formulation as in claim 7, wherein said pigments are FEF carbon black, HAF carbon black, zinc oxide, and magnesium oxide.

11. A low leaching nonpolluting marine antifouling covering formulation as in claim 7, wherein said processing compound is lauric acid.

12. A low leaching nonpolluting marine antifouling covering formulation as in claim 7, wherein said organometallic polymer containing a pendant group tri-n-butyltin is poly (tri-n-butyltin methacrylate-co-methyl methacrylate) 1:1 mole ratio.

13. A low leaching nonpolluting marine antifouling covering formulation as in claim 7, wherein said organometallic polymer containing a pendant group tri-n-butyltin is tri-n-butyltin ester of poly (methyl vinyl ether-co-maleic acid) 1:1 mole ratio.

14. A low leaching nonpolluting marine antifouling covering formulation comprising of the blended product of the following materials and consisting essentially of, by weight:
   (a) from about 46% to about 85% of natural rubber,
   (b) from about 7% to about 25% of selected fillers, antioxidants, accelerators, pigments, and other processing compounds, and
   (c) from about 1% to about 48% of organometallic polymer containing pendant group tri-n-butyltin selected from the group consisting of poly (tri-n-butyltin methyacrylate-co-tri-n-propyltin methacrylate-co-methyl methacrylate) 1:1:1 mole ratio, poly (tri-n-butyltin methacrylate-co-methyl methacrylate) 1:1 mole ratio, tri-n-butyltin ester of poly (methyl vinyl ether-co-maleic acid) 1:1 mole ratio and tri-n-butyltin ester of poly methacrylic acid cross-linked with divinylbenzene.

15. A low leaching nonpolluting marine antifouling covering formulation as in claim 14, wherein said acclerator is benzothiazyl disulfide.

16. A low leaching nonpolluting marine antifouling covering formulation as in claim 14, wherein said antioxidant is phenyl-b-naphthalene.

17. A low leaching nonpolluting marine antifouling covering formulation as in claim 14, wherein said pigments are HAF carbon black and zinc oxide.

18. A low leaching nonpolluting marine antifouling covering formulation as in claim 14, wherein said filler material is sulfur.

19. A low leaching nonpolluting marine antifouling covering formulation as in claim 14, wherein said processing compound is stearic acid.

20. A low leaching nonpolluting marine antifouling covering formulation as in claim 14, wherein said organometallic polymer containing a pendant group tri-n-butyltin is poly (tri-n-butyltin methacrylate-co-tri-n-propyltin methacrylate-co-metyl methacrylate) 1:1:1 mole ratio.

21. A low leaching nonpolluting marine antifouling covering formulation as in claim 14, wherein said organometallic polymer containing a pendant group tri-n-butyltin is tri-n-butyltin ester of poly (methyl vinyl ether-co-maleic acid) 1:1 mole ratio.

22. A low leaching nonpolluting marine antifouling covering formulation as in claim 14, wherein said organometallic polymer containing a pendant group tri-n-butyltin is tri-n-butyltin ester of poly methacrylic acid cross-linked with divinylbenzene.

23. A low leaching nonpolluting marine antifouling covering formulation comprising of the blended product of the following materials and consisting essentially of, by weight
   (a) from about 44% to about 62% of EPD (ethylene-propylene-diene) rubber,
   (b) from about 7% to about 25% of selected accelerators and pigments, and
   (c) from about 4% to about 30% of organometallic polymer containing pendant group tri-n-butyltin selected from the group consisting of poly (tri-n-butyltin methyacrylate-co-tri-n-propyltin methacrylate-co-methyl methacrylate) 1:1:1 mole ratio, poly (tri-n-butyltin methacrylate-co-methyl 2methacrylate) 1:1 mole ratio, tri-n-butyltin ester of poly (methyl vinyl ether-co-maleic acid) 1:1 mole ratio and tri-n-butyltin ester of poly 24. A low leaching nonpolluting marine antifouling covering formulation as in claim 23, wherein said acclerators are 2-mercaptobenzothiozole and tetramethylthiuram disulfide.

25. A low leaching nonpolluting marine antifouling covering formulation as in claim 23, wherein said pigments are HAF carbon black and zinc oxide.

26. A low leaching nonpolluting marine antifouling covering formulation as in claim 23, wherein said organometallic polymer containing a pendant group tri-n-butyltin is poly (tri-n-butyltin methacrylate-co-methyl ethacrylate) 1:1 mole ratio.

27. A low leaching nonpolluting marine antifouling covering formulation s in claim 23, wherein said organometallic polymer containing a pendant roup tri-n-butyltin is tri-n-butyltin ester of poly (methyl vinyl ether-co-maleic acid) 1:1 mole ratio.

* * * * *